US008020014B2

(12) United States Patent
Priel et al.

(10) Patent No.: US 8,020,014 B2
(45) Date of Patent: Sep. 13, 2011

(54) METHOD FOR POWER REDUCTION AND A DEVICE HAVING POWER REDUCTION CAPABILITIES

(75) Inventors: Michael Priel, Hertzelia (IL); Dan Kuzmin, Givat Shmuel (IL); Anton Rozen, Gedera (IL); Leonid Smolyanski, Or Akiva (IL)

(73) Assignee: Freescale Semiconductor, Inc., Austin, TX (US)

( * ) Notice: Subject to any disclaimer, the term of this patent is extended or adjusted under 35 U.S.C. 154(b) by 867 days.

(21) Appl. No.: 11/914,079

(22) PCT Filed: May 11, 2005

(86) PCT No.: PCT/IB2005/051539

§ 371 (c)(1),
(2), (4) Date: Nov. 9, 2007

(87) PCT Pub. No.: WO2006/120507
PCT Pub. Date: Nov. 16, 2006

(65) Prior Publication Data
US 2008/0209248 A1    Aug. 28, 2008

(51) Int. Cl.
G06F 1/32 (2006.01)
G06F 1/00 (2006.01)
G06F 11/30 (2006.01)

(52) U.S. Cl. ............ 713/320; 713/300; 713/340
(58) Field of Classification Search ............ 713/340
See application file for complete search history.

(56) References Cited

U.S. PATENT DOCUMENTS

| | | | |
|---|---|---|---|
| 5,483,656 A * | 1/1996 | Oprescu et al. ............ 713/320 |
| 6,169,419 B1 | 1/2001 | De et al. |
| 6,477,388 B1 * | 11/2002 | Schmutz ............ 455/522 |
| 6,742,100 B1 * | 5/2004 | Schnee et al. ............ 711/173 |
| 7,203,852 B2 * | 4/2007 | Cohen et al. ............ 713/320 |
| 2001/0038277 A1 | 11/2001 | Burstein et al. |
| 2002/0000797 A1 | 1/2002 | Schultz et al. |
| 2002/0049918 A1 | 4/2002 | Kaxiras et al. |
| 2003/0139927 A1 | 7/2003 | Gabarra et al. |
| 2003/0145241 A1 | 7/2003 | Hu et al. |
| 2004/0008056 A1 | 1/2004 | Kursun et al. |
| 2004/0025068 A1 | 2/2004 | Gary et al. |
| 2004/0052098 A1 | 3/2004 | Burtsein et al. |
| 2004/0133746 A1 | 7/2004 | Edirisooriya et al. |
| 2004/0158750 A1 | 8/2004 | Syed et al. |
| 2004/0230849 A1 | 11/2004 | Dhong et al. |

(Continued)

OTHER PUBLICATIONS

Burd et al; "A Dynamic Voltage Scaled Microprocessor System"; IEEE Journal of Solid-State Circuits, vol. 35, No. 11, Nov. 2000.

(Continued)

*Primary Examiner* — Suresh K Suryawanshi

(57) ABSTRACT

A method for power reduction, the method includes determining whether to power down the at least portion of the component in response to a relationship between an estimated power gain and an estimated power loss resulting from powering down the at least portion of the component during the low power mode, and selectively providing power to at least a portion of a component of an integrated circuit during a low power mode. A device having power reduction capabilities, the device includes power switching circuitry, and a power management circuitry adapted to determine whether to power down at least the portion of the component during a low power mode in response to a relationship between an estimated power gain and an estimated power loss resulting from powering down the at least portion of the component during the low power.

23 Claims, 2 Drawing Sheets

U.S. PATENT DOCUMENTS

2004/0260957 A1  12/2004  Jeddeloh et al.
2005/0044448 A1   2/2005  Verdum

OTHER PUBLICATIONS

Kalla, P. et al., "LRU-SEQ: A Novel Replacement Policy for Transition Energy Reduction in Instruction Caches," IEEE/ACM International Conference on Computer Aided Design; Nov. 9, 2003; ISBN: 1-58113-762-1; pp. 518-522.

Lorch, J. et al., "Software Strategies for Portable Computer Energy Management," IEEE Personal Communications, IEEE Communications Society, US, vol. 5, No. 3; Jun. 1998; pp. 60-73.

PCT International Search Report mailed Apr. 4, 2006 for PCT/IB2005/051539, 4 pages.

* cited by examiner

METHOD FOR POWER REDUCTION AND A DEVICE HAVING POWER REDUCTION CAPABILITIES

FIELD OF THE INVENTION

The present invention relates to a method for power management and a device having power management capabilities, and especially for power reduction of a cache memory during a low power mode.

BACKGROUND OF THE INVENTION

Cache Memories

Cache modules are high-speed memories that facilitate fast retrieval of information including data and instructions. Typically, cache modules are relatively expensive and are characterized by a small size, especially in comparison to higher-level memory modules.

The performance of modern processor-based systems usually depends upon the cache module performances and especially to a relationship between cache hits and cache misses. A cache hit occurs when an information unit that is present in a cache module memory is requested. A cache miss occurs when the requested information unit is not present in the cache module and has to be fetched from a another memory that is termed a higher-level memory module.

Various cache module modules and processor architectures, as well as data retrieval schemes, were developed over the years, to meet increasing performance demands. These architectures included multi-port cache modules, multi-level cache module architecture, super scalar type processors and the like.

The following U.S patents and patent applications, all being incorporated herein by reference, provide a brief summary of some state of the art cache modules and data fetch methods: U.S. Pat. No. 4,853,846 of Johnson et al., titled "Bus expander with logic for virtualizing single cache control into dual channels with separate directories and prefetch for different processors"; U.S. patent application publication number 20020069326 of Richardson et al., titled "Pipelines non-blocking level two cache system with inherent transaction collision-avoidance"; U.S. Pat. No. 5,742,790 of Kawasaki titled "Detection circuit for identical and simultaneous access in a parallel processor system with a multi-way multi-port cache"; U.S. Pat. No. 6,081,873 of Hetherington et al., titled "In-line bank conflict detection and resolution in a multi-ported non-blocking cache"; U.S and U.S. Pat. No. 6,272,597 of Fu et al., titled "Dual-ported, pipelined, two level cache system".

Processors and other information requesting components are capable of requesting information from a cache module and, alternatively or additionally, from another memory module that can be a higher-level memory module. The higher-level memory module can also be a cache memory, another internal memory and even an external memory.

There are various manners to write information into a cache module or a higher-level memory module. Write-through involves writing one or more information units to the cache module and to the higher-level memory module substantially simultaneously. Write-back involves writing one or more information units to the cache module. The cache module sends one or more updated information units to the high-level memory once that one or more updated information units are removed from the cache. The latter operation is also known in the art as flushing the cache.

Some prior art cache modules include multiple lines that in turn are partitioned to segments. Each segment is associated with a validity bit and a dirty bit. A valid bit indicates whether a certain segment includes valid information. The dirty bit indicates if the segment includes valid information that was previously updated but not sent to the higher-level memory module. If a write back policy is implemented only the segments that are associated with an asserted dirty bit are written to the high-level memory module.

Power Reduction Techniques

Mobile devices, such as but not limited to personal data appliances, cellular phones, radios, pagers, lap top computers, and the like are required to operate for relatively long periods before being recharged. These mobile devices usually includes one or more processors as well as multiple memory modules and other peripheral devices.

In order to reduce the power consumption of mobile devices various power consumption control techniques were suggested. A first technique include selectively shutting down components. Another technique involves reducing the clock frequency of the mobile device. A third technique is known as dynamic voltage scaling (DVS) or alternatively is known as dynamic voltage and frequency scaling (DVFS) and includes altering the voltage that is supplied to a processor as well as altering the frequency of a clock signal that is provided to the processor in response to the computational load demands (also referred to as throughput) of the processor. Higher voltage levels are associated with higher operating frequencies and higher computational load but are also associated with higher energy consumption.

The following U.S. patents, U.S. patent applications, and article, all being incorporated herein by reference, illustrate various power reduction techniques: U.S. patent application publication number 2004/0008056 of Kursun et al.; U.S. Pat. No. 6,169,419 of De et al., U.S. patent application publication number 20040052098 of Burstein et al.; U.S. patent application publication number 20030139927 of Gabara, et al.; U.S. patent application publication number 20040260957 of Jeddeloh et al.; U.S. patent application publication number 20020000797 of Burstein et al.; U.S. patent application publication number 20040025068 of Gary et al.; U.S. patent application publication number 20040158750 of Syed et al.; U.S. patent application publication number 20040230849 of Dhong et al.; U.S. patent application publication number 20010038277 of Burstein et al.; U.S. patent application publication 20050044448 of Verdun; and "A Dynamic Voltage Scaled Microprocessor System", T. D. Burd, T. A. Pering, A. J. Stratakos and R. W. Brodersen, IEEE Journal Journal of solid-state circuits, Vol. 35, No. 11, November 200, all being incorporated herein by reference, provide a brief review of some dynamic voltage scaling techniques.

U.S. patent application publication number 20040133746 of Edirisooriya et al, which is incorporated herein by reference, describes a cache that includes multiple ways. Dirty data can be written only to some predefined ways. These predefined ways are not powered down during low power modes while the other ways of the cache memory are powered down.

U.S. patent application publication number 20030145241 of Hu et al., and U.S. patent application publication number 20020049918 of Kaxiras et al., describe complex methods and apparatuses for powering down cache lines that were not accessed during a cache line decay interval. Thus, cache lines that were not accessed for a long time will be power down during a low power mode.

There is a need to provide an efficient method and device for power reduction.

SUMMARY OF THE PRESENT INVENTION

A method for power reduction and a device having power reduction capabilities, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The following figures illustrate exemplary embodiments of the invention. They are not intended to limit the scope of the invention but rather assist in understanding some of the embodiments of the invention. It is further noted that all the figures are out of scale.

For convenience of explanation the following detailed explanation relates to a cache memory but the invention can be applied to other components, and especially to components that are characterized by a varying power loss and/or a varying power gain associated with entering a low power mode.

Power loss resulting from entering a low power mode can be associated with operations to be executed before entering the low power mode and/or can be associated with operations that are executed when or after exiting the low power mode.

The power losses or power gain can change over time in a significant manner. The change can be attributed to a change in the number or operations (such as data retrieval operations) associated with entering an/or exiting a low power mode.

If the component to be powered down during a low power mode is a cache or a cache portion then the power loss or gain is conveniently responsive to the power consumed during a flushing operation as well as data retrieval after the cache exits the low power mode. The change can also be attributed to a change in characteristics (such as length) of power down periods.

According to another embodiment of the invention the powering down can be applied in addition to other power saving stages such as clock frequency reduction, dynamic body biasing and the like.

It is assumed, for convenience of explanation that when a high level memory is powered during the low power mode, but this is not necessarily so. It can be checked to determine whether it includes relevant information and if the answer is negative it can also be powered down.

Figure 1:
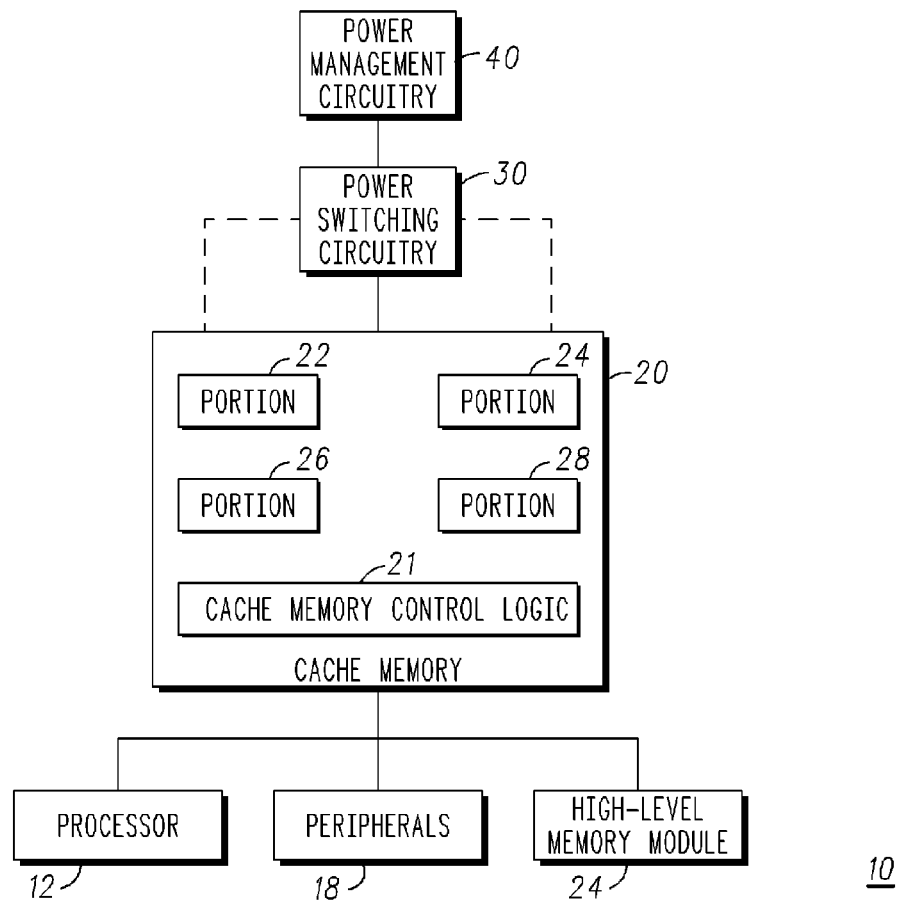
FIG. 1 illustrates a device according to an embodiment of the invention.

FIG. 1 illustrates a device 10 according to an embodiment of the invention. It is noted that the invention can be applied in devices of different configurations.

Device 10 includes multiple components, that are conveniently located on the same integrated circuit. Device 10 includes a processor 12, a cache memory 20, a high level memory module 24, power switching circuitry 30, power management circuit 40 and peripherals 18, all being connected to a system bus. The high-level memory module 24 is an example of another memory module that is accessible by the processor 12. It usually stores programs and/or data for the processor. It can also be a second level cache memory module supporting off-chip memories, but this is not necessarily so. If a cache miss occurs the data can be fetched from the high-level memory module 24 or from other memory modules.

According to one embodiment of the invention the cache memory is treated as a single unit and can be totally closed or open. According to another embodiment of the invention the cache memory includes multiple portions that managed independently from each other. FIG. 1 illustrates the second embodiment.

The cache memory 20 includes multiple portions 22, 24, 26 and 28 can receive power independently from each other. Conveniently each portion includes a single cache way, but this is not necessarily so. A portion can include a group of ways, multiple lines that do not form a way, multiple line segments and the like. Usually power consumption can vary more dynamically when a larger number of segments or lines is involved. Thus, the method can be better suited to cache memory portions that include multiple lines.

Power is provided to power switching circuitry 30 that can, in response to control signals from a power management circuit 40, supply power to one or more portion of cache memory 20 or power down one or more other portion of cache memory 20 during a low power mode. The power switching circuitry 30 usually includes one or more transistorized switches.

The power switching circuitry 30 is connected to power management circuitry 40 that is adapted to determine whether to power down at least the portion of the cache memory during a low power mode. The determination is responsive to a relationship between: (a) an estimated power gain resulting from powering down the at least portion of the cache memory during the low power mode, and (b) an estimated power loss associated with powering down the at least portion of the cache memory during the low power mode.

The power management circuitry 40 can include hardware components, a combination of software and hardware components and the like. It can cooperate with processor 12 that in turn executes a set of instructions that assist in the determination. The assistance can include estimating either one of the power loss or the power gain.

According to one embodiment of the invention the power management circuitry 40 includes a counter 29 that counts the amount (DI) of dirty information by counting the dirty bits or otherwise estimated the amount dirty data stored within the cache. The estimation can be based upon a comparison between the amount (W) of write operations to the cache by the processor and the amount of write back operations (WB) from the cache to the high level memory. This calculation also takes into account the amount of information written during a write back and write operation. For simplicity of explanation it is assumed that the amount of information that is written during each operation is the same.

DI reflects the amount of valid dirty information. When calculating DI, and especially when calculating the amount of dirty bits, the power management circuitry 40 is also responsive to the valid bits associated with the dirty bits. According to another embodiment of the invention a dirty bit is reset once the information is not valid.

DI=W−WB, and the power management circuitry compares DI to a power gating threshold TH. If DI<TH then the cache memory is flushed and is powered down during a low power threshold.

According to various embodiments of the invention TH (and DI) can be calculated per cache memory portion. TH can be updated in response to various parameters such as temperature, clock frequency, cache statistics, and device behavior.

TH can stored within the power management circuitry 40 but this is not necessarily so.

Figure 2:
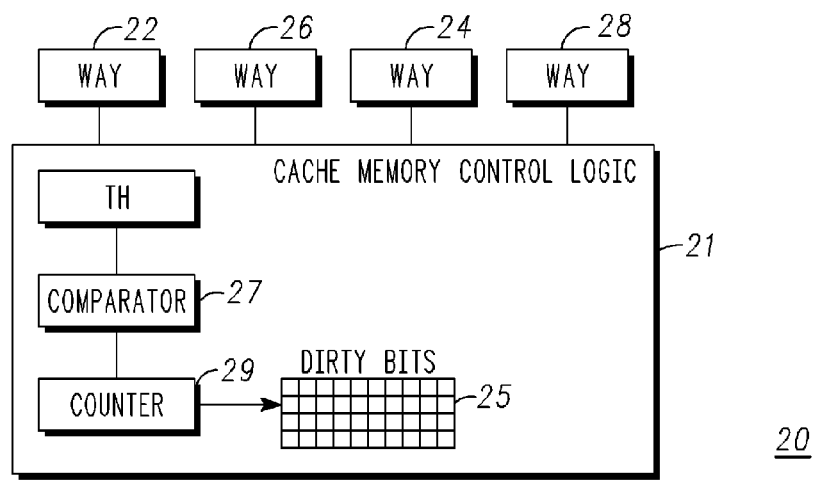
FIG. 2 illustrates a cache and a power management circuitry, according to an embodiment of the invention.

FIG. 2 illustrates a cache memory 20, according to an embodiment of the invention.

Cache memory 20 includes multiple ways 22-28 and a cache memory control logic 21. Each way can powered independently from the other ways.

Assuming that a write back policy is applied, the cache memory control logic 21 updates dirty bits (collectively denoted 25) to reflect that information was written to the cache memory. The dirty bits also reflect is that information was written to the high-level memory or not.

Conveniently, the cache memory control logic 21 counts, by counter 29, the amount of asserted dirty bit. The cache memory control logic can also compare, for example by comparator 27, between the amount of write operations to different locations in the memory and between the amount of write back operations from different locations of the cache memory. This, if a certain cache line (or segment) was involved in different write operations the counter will count only one of these different write operations.

The counter is conveniently reset whenever the cache memory 20, or the relevant portion is powered down.

Figure 3:
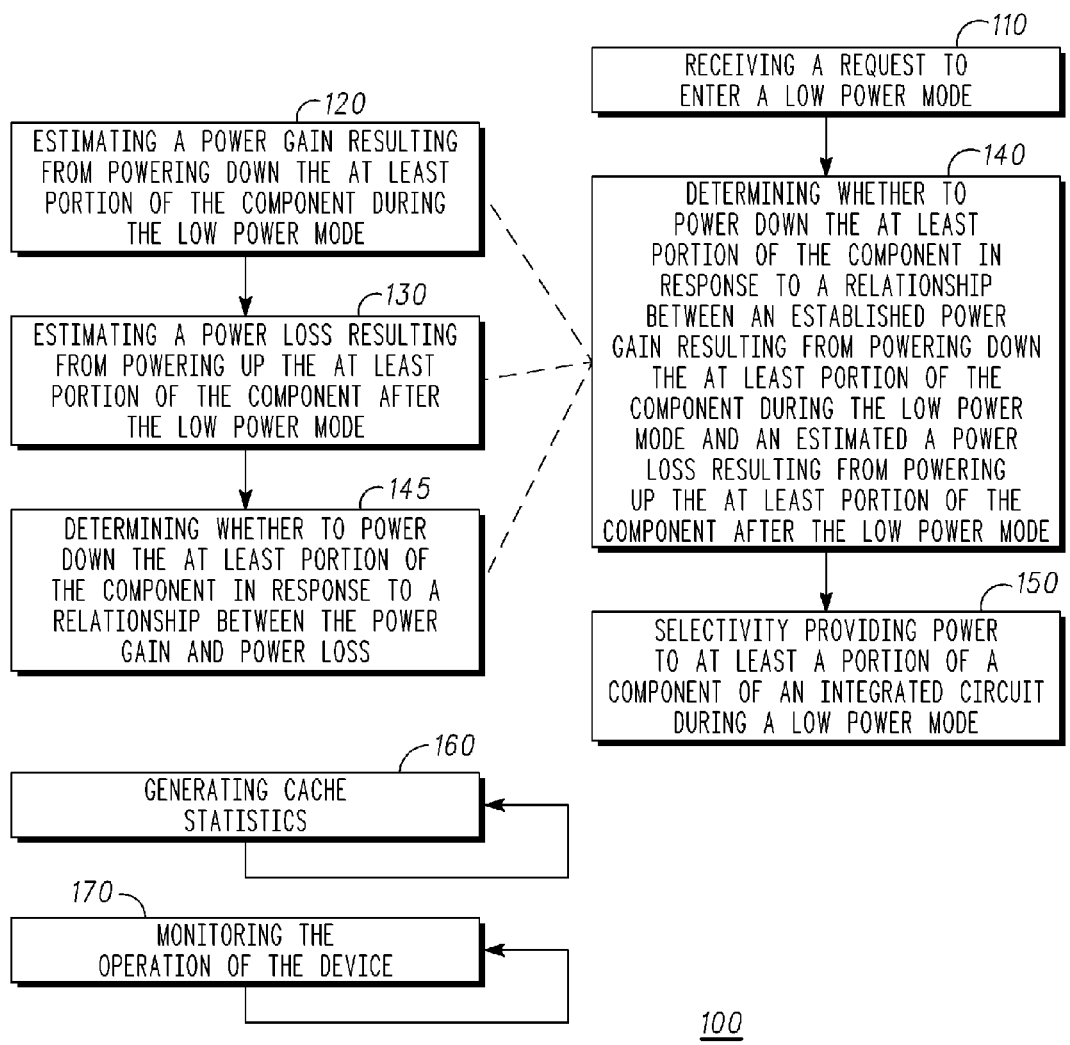
FIG. 3 is a flow chart of a power management method, according to an embodiment of the invention.

FIG. 3 illustrates method 100 for power reduction according to an embodiment of the invention.

Method 100 starts by stage 110 of receiving a request to enter a low power mode. The request can be initiated from various components of a device. Typically, a device includes either a single device power management entity or multiple entities that can determine, for the whole device or for parts of the device, to enter into a low power mode.

Stage 110 is followed by stage 140 of determining whether to power down the at least portion of the component in response to a relationship between an estimated power gain resulting from powering down the at least portion of the component during the low power mode period and an estimated a power loss resulting from powering down the at least one portion during the low power mode period.

For simplicity of explanation stage 140 is split to three stages: stage 120 of estimating a power gain resulting from powering down the at least portion of the component during the low power mode, stage 130 of estimating a power loss resulting from powering down the at least portion of the component during the low power mode, and stage 145 of determining whether to power down the at least portion of the component in response to a relationship between the power gain and power loss.

Stage 120 includes estimating a power gain resulting from powering down the at least portion of the component during the low power mode. It is noted that this estimation can be done each time a request for entering power down is received but this is not necessarily so.

According to various embodiments of the invention this estimation is made in a periodical manner, in a random manner, in a pseudo-random manner, and/or in response to the occurrence of events. These events can include a certain battery level, a change in a clock frequency supplied to the component, and the like.

According to an embodiment of the invention the power gain is predefined and can be provided by the manufacturer of the device that includes the cache, can be downloaded over a network, and the like.

According to yet another embodiment of the invention the estimation is responsive to the duration or other characteristics of the low power mode. This duration can be estimated by monitoring the operation of the device and trying to estimate the duration of the power down period. This monitoring can be performed over long periods (hours, days, weeks and even more), or over shorter periods.

Stage 170 illustrates this monitoring stage. Stage 170 can be executed in parallel to other stages of method 100, but can also be executed serially to these other stages. Typically, due to the complexity and length of stage 170 it is implemented by software or a combination of software and hardware.

The estimation can be highly effective if the low power period follows a repetitive (or otherwise significantly predictive) pattern. For example, short low power periods of about the same length can occur between pressing of a mobile phone keys, when dialing a number, writing SMS messages or otherwise contacting the mobile keys. When, for example, the user dials a number then the amount of dialed digits and hence the amount of short low power periods can be estimated. Longer low power modes can occur between one phone conversation and another.

Conveniently, the component is a cache memory. Conveniently, the cache memory includes independently powered portions. There portions can be cache lines, cache ways, group of lines that differ from cache ways, groups of ways and the like.

Stage 120 is followed by stage 130 of estimating a power loss associated with powering down the at least portion of the component during the low power mode.

This power loss indicates the power consumed during information retrieval operation from the cache memory (for example during a flushing operation) and information retrieval to the cache memory.

Conveniently the estimation is responsive to the amount of dirty information that is stored in the cache. Dirty information is information that is stored in the cache but not in another, usually higher level, memory unit. The presence of such information is indicated by a dirty bit. Said bit is also referred to as sticky bit.

According to an embodiment of the invention an amount of dirty lines is compared to a threshold representative of the estimated power gain in order to determine the relationship between the power loss and power gain.

Stage 130 is followed by stage 145 of determining whether to power down the at least portion of the component in response to a relationship between the power gain and power loss. Conveniently, if the power gain is greater than the power loss the cache memory is shut down during the low power mode. If the gain equals the loss then the component can be shut down or remain powered up.

Stage 140 is followed by stage 150 of selectively providing power to at least a portion of a component of an integrated circuit during a low power mode.

According to an embodiment of the invention the cache memory includes multiple independently powered portions. It is assumed that these portions are ways. In such a case stages 120 and 130 can be applied for each portion to determine whether or not to power down that certain components. Conveniently, certain portions are allocated for storing dirty information and the estimation is applied on these portions alone. For example, assuming that four thresholds (usually the same threshold) TH1-TH4 are associated with portions 22-28 of cache memory 28 and that the amount of dirty bits within each portion is denoted DI1-DI4 respectively then the method include performing four comparisons between TH1-

TH4 and DI1-DI4 are for each portion, determining whether to perform a power down during the low power mode.

According to an embodiment of the invention method 100 also includes stage 160 of generating cache statistics. These statistics can affect the estimation of power loss. For example, if after a low power period during which the cache memory was not powered down, the miss rate is high then the method can decide that it should power down the cache memory during the next power period.

According to another embodiment of the invention the power loss and/or the power gain can be evaluated in response to various parameters that affect the power consumption rate. These parameters can include temperature, the frequency of the clock signal provided to the component and the like. Higher temperatures usually result in lower clock frequencies and higher energy consumption. Clock frequency can be changed when applying power reduction techniques such as DVLS. The frequency of clock signal that is provided to the cache affects its power consumption.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for power reduction, the method comprises:
    selectively providing power to at least a portion of a component of an integrated circuit during a low power mode; and
    determining whether to power down the at least portion of the component in response to a relationship between an estimated power gain and an estimated power loss resulting from powering down the at least portion of the component during the low power mode.

2. The method according to claim 1 wherein the component is a cache memory.

3. The method according to claim 2 wherein the component is a cache memory that comprises independently powered portions.

4. The method according to claim 2, wherein the determining is responsive to an amount of information that is stored only in the cache memory.

5. The method according to claim 1, wherein the determining is responsive to an amount of information associated with dirty bits.

6. The method according to claim 1, wherein the determining of power gain is responsive to an amount of information stored only within a cache memory and the location of said information within various independently powered portions of the cache memory.

7. The method according to claim 1, generating cache statistics, and wherein the determining is responsive to the generated cache statistics.

8. The method according to claim 1 wherein the determining is responsive to power consumed during information retrieval.

9. The method according to claim 1 monitoring integrated circuit behavior, and wherein the stage of determining is responsive to results of the monitoring.

10. The method according to claim 1 wherein the stage of determining is responsive to temperature.

11. The method according to claim 1 wherein the stage determining is responsive to clock frequency.

12. A device having power reduction capabilities, the device comprises:
    power switching circuitry adapted to selectively provide power to at least a portion of a component of the device during a low power mode, having power management circuitry adapted to determine whether to power down at least the portion of the component during a low power mode in response to a relationship between an estimated power gain and an estimated power loss resulting from powering down the at least portion of the component during the low power mode.

13. The device according to claim 12 wherein the component is a cache memory.

14. The device according to claim 13 wherein the component is a cache memory that comprises independently powered portions.

15. The device according to claim 13, wherein the determination is responsive to an amount of information that is stored only in the cache memory.

16. The device according to claim 12, wherein the determination is responsive to an amount of information associated with dirty bits.

17. The device according to claim 12 wherein the estimation of power gain is responsive to an amount of information stored only within a cache memory and the location of said information within various independently powered portions of the cache memory.

18. The device according to claim 12, further adapted to generate cache statistics, and wherein the determination is responsive to the generated cache statistics.

19. The device according to claim 12 wherein the determination is responsive to power consumed during information retrieval.

20. The device according to claim 12 further adapted to monitor integrated circuit behavior, and wherein the determination is responsive to results of the monitoring.

21. The device according to claim 12 further adapted to receive a temperature indication and wherein the determination is responsive to the temperature indication.

22. The device according to claim 12 further adapted to receive a clock signal frequency indication and wherein the determination is responsive to the clock signal frequency indication.

23. A method for power reduction, the method comprises:
    selectively powering down a portion of a component of an integrated circuit in response to the portion having a plurality of dirty bits greater than a threshold number of dirty bits.

* * * * *